United States Patent [19]

Honda et al.

[11] Patent Number: 4,682,855

[45] Date of Patent: Jul. 28, 1987

[54] LASER-LIGHT ABSORBER AND METHOD FOR ABSORBING LASER LIGHT

[75] Inventors: Tatsutoku Honda; Michiyuki Endo, both of Ibaraki; Saburo Wakamatsu, Tokyo; Yoshio Kudo, Saitama, all of Japan

[73] Assignees: Director-General of Agency of Industrial Science and Technology; Showa Denko Kabushiki Kaisha, both of Tokyo, Japan

[21] Appl. No.: 700,221

[22] Filed: Feb. 11, 1985

[51] Int. Cl.$^4$ .................. G02B 5/00; G02B 27/00
[52] U.S. Cl. .................. 350/276 R; 350/642
[58] Field of Search .................. 350/276 R, 642

[56] References Cited

U.S. PATENT DOCUMENTS 4,448,855  5/1984  Senaha et al. .................. 350/642
4,490,184 12/1984  Forcht et al. .................. 350/642

FOREIGN PATENT DOCUMENTS 2111683  6/1972  France .................. 350/642
54-118848  9/1979  Japan .
57-47592  3/1982  Japan .
58-4103  1/1983  Japan .
58-30701  2/1983  Japan .
59-66032  4/1984  Japan .

*Primary Examiner*—John K. Corbin
*Assistant Examiner*—Rebecca D. Gass
*Attorney, Agent, or Firm*—Sughrue, Mion, Zinn, Macpeak & Seas

[57] ABSTRACT

A laser-light absorber including a metal body and a flame-sprayed film essentially consisting of metal oxide applied on the metal body. The laser-absorbing properties of a laser-shield for laser welding, cutting, hardening machines, and the like are improved by applying the flame-sprayed film on the metal body.

12 Claims, 6 Drawing Figures

Fig. 1 PRIOR ART
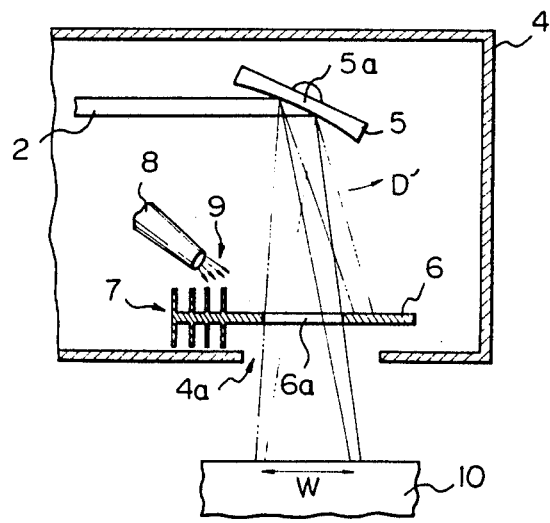
Fig. 2
PRIOR ART
Fig. 3
PRIOR ART
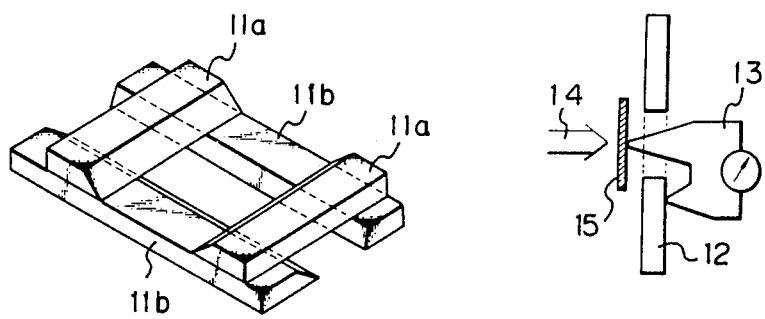

LASER-LIGHT ABSORBER AND METHOD FOR ABSORBING LASER LIGHT

BACKGROUND OF THE INVENTION (1) Field of the Invention

The present invention relates to an absorber of high energy light, particularly laser light, and to a method for absorbing laser light.

(2) Description of the Related Art

A laser beam is a coherent beam of light having a high density and matched phase as opposed to conventional monochromatic light. The special characteristics of laser beams enable application in steadily expanding fields. Various devices utilizing laser light are provided with laser-light absorbers.

Japanese Unexamined Patent Publication (Kokai) No. 54-118848 discloses a laser-beam scanning apparatus. In FIG. 1, which shows an apparatus 4, reference numeral 2 shows a laser beam, 4a an outlet, 5 a vibrating mirror, 6 a shielding plate, 6a an aperture, 7 a radiation fin, 8 an air jet nozzle for cooling the radiator fin, 9 air, 10 a workpiece, D-D' the vibrating direction, and W a hardening width. The shielding plate 6 is made of a metallic member having a high thermal conductivity, for example, a copper plate.

Japanese Unexamined Patent Publication (Kokai) No. 57-47592 discloses a beam shielding device such as shown in FIG. 2. In this beam shielding device, four sheets 11a, 11b define an aperture for passing the laser beam. The surface area of this aperture can be varied by displacing the sheets 11a, 11b. The sheets 11a, 11b are made of a material which can absorb the laser beam. As an example, graphite is mentioned in the publication.

Japanese Unexamined Patent Publication (Kokai) No. 58-30701 is related to an invention for providing a light-absorbing body with an extremely low reflectivity of light, particularly a $CO_2$ laser. The light-absorbing body disclosed in the above publication is characterized by being mainly composed of glass and an additional component, such as $K_2O$ or $ZnO$ and exhibits reflectivity lower than that of metal, black alumite, black paint, and brick. FIG. 3 shows an electric-power receptor for measuring the temperature increase due to irradiation of laser light. In FIG. 3, a laser beam 14 is applied on the glass sheet 15, which is in contact with a thermocouple 13 for measuring the temperature increase relative to a low-temperature copper sheet 12.

Japanese Unexamined Patent Publication (Kokai) No. 58-4103 discloses a shielding plate 23 (FIG. 4) for shielding a laser beam 21. The shielding plate 23 is swivelled around an axis 24. When the shielding plate 23 is swivelled around the axis 24 by a certain angle, the laser beam 24 is emitted through an opening 22. The swivelling motion of the shielding plate 23 is limited by a stopper 25. The apparatus 20 is used as a surgical knife. The invention of the above publication is generally related to the structure of the apparatus 20 as summarized above.

Japanese Unexamined Patent Publication (Kokai) No. 59-66032 disclose a piercing device using a laser, such as shown in FIG. 5. In the figure, 31 shows a light-emitting tube constituted by a 40 W metal halide lamp, 31a a central part, 31 ends, 31c a part to be pierced, 32 a chuck for holding one of the ends 31b, 33 a shield, 34 a laser, such as a $CO_2$, ruby, or YAG laser, and 35 a convex lens. The shield 33 is made of metal, particularly a high melting-point metal, ceramic, silicon or a metal having a reflective coating. The above publication describes the material properties required by a shield plate for low absorptivity and heat resistance.

Laser light is used also for communication, data transmission, precision measurement, and the like. The following properties are required for a laser-light absorber.

(1) A high efficiency of absorption of the laser energy.

(2) A high efficiency of absorption over a broad ranges of the laser wavelength and output when a device emits or receives such laser light.

In this regard, various laser sources, such as He-Ne lasers with low output and $CO_2$, ruby, and YAG lasers are available. The wavelength broadly varies from 0.2 $\mu$m to 1 mm, and the power broadly varies from $10^{-4}$ to $10^{12}$ W. In measuring the power of laser light either thermally or photoelectrically, a single tester cannot be used because of the broad variation of the wavelength and output and, also, various propagation modes of the laser light. In a tester for measuring the power of a laser having a predetermined range of wavelength and the like, and absorber should have a high absorptivity irrespective of the variation in the wavelength and the like.

(3) Resistance to exposure of strong energy over a long time when high-energy laser light is used.

Especially in a cutting or welding device, the power of laser light is increased, so as to enable working of a large-sized article. This means the absorber used in a tester for measuring the power of laser light must also be resistant to exposure of high-energy laser light.

(4) Small dependency of absorptivity upon the wavelength of laser light, especially when the absorber is used for absorption of high-energy laser light.

Particularly, the absorber used in calorimetric measurement of laser power must have such a small dependency. Calorimetric measurement is one of the thermal measurement methods of laser power. In this method, the laser light is absorbed by a receptor of the absorber for conversion to heat, and the laser power is indirectly measured by means of measuring the temperature change in the receptor, the volume or pressure change in the receptor, or the vaporization amount of the material of the receptor. Calorimetric measurement utilizing, temperature change is the most accurate and is broadly use.

(5) Thermal stability and durability.

It is known to improve the above-described properties of copper by vacuum-depositing gold black or platinum black on a copper body or depositing black paint or carbon black on the copper body. Gold-black deposited copper exhibits the most improved properties (1) to (2) and (4) to (5), but has an unsatisfactory property (3), since it can resist only a few watts per $cm^2$ in area thereof the highest.

It is known to electrolytically plate chromium on a water-cooled copper box. The chromium-plated water-cooled copper box has an improved property (3) over gold-black deposited copper but its property (3) is still unsatisfactory.

No prior art referred herein discloses the properties of flame-sprayed oxide with regard to absorption of laser light.

SUMMARY OF THE INVENTION

It is an object of the present invention to provide a laser-light absorber for use for shielding or absorbing laser light having a high energy and a method for absorbing laser light having a high energy.

According to an aspect of the present invention, there is provided a laser-light absorber including a metal body and a flame-sprayed film essentially consisting of metal oxide applied on the metal body.

According to another aspect, there is provided a method for absorbing laser light, including the steps of: preparing a laser-light absorber including a metal body and a flame-sprayed film essentially consisting of metal oxide and applied on the metal body; orienting the flame-sprayed film toward a source of laser light; exposing the flame-sprayed film to irradiation of a beam of the laser light; and absorbing the beam of laser light by an exposed portion of the flame-sprayed film in an amount of at least approximately 90% and approximately 97.5% at the highest in terms of inverse reflectivity.

BRIEF DESCRIPTION OF THE DRAWINGS

The appended drawings FIGS. 1–5 illustrate known apparatuses or absorbers of laser light, in which:

FIG. 1 shows a laser-beam scanning apparatus for hardening a workpiece;

FIG. 2 shows a beam shielding device used in a cutting, welding, piercing, or heat-treating device using a laser beam;

FIG. 3 shows a laser-beam receptor used in an optical device or a watt meter;

FIG. 4 shows a surgical knife;

FIG. 5 shows a metal-vapor discharge lamp;

DESCRIPTION OF THE PREFERRED EMBODIMENTS

The present inventors repeated experiments of plasma-spraying metal oxides, such as alumina ($Al_2O_3$), titania ($TiO_2$), zirconia ($ZrO_2$), magnesia ($MgO$), chromia ($Cr_2O_3$), and the like on a metal surface and discovered that a plasma-sprayed film consisting of metal oxides has excellent properties (1) to (5), particularly (1), (3), and (5).

In accordance with the objects of the present invention, there is provided a laser-light absorber having a flame-sprayed metal oxide film on a metallic substrate. The flame-sprayed metal oxide film may essentially consist of at least one ceramic oxide selected from the group consisting of $Al_2O_3$, $TiO_2$, $ZrO_2$, $MgO$ and $Cr_2O_3$. When the main component of flame-sprayed metal oxide film is $Al_2O_3$, property (5) is superior to that of other metal oxides. When the main component of flame-sprayed metal oxide film is $TiO_2$, property (1) is superior to that of other metal oxides. When the flame-sprayed metal oxide film consists of $Al_2O_3$ and $TiO_2$, both excellent properties (1) and (5) are combined. Such a film preferably consists of from 20% to 80% of $Al_2O_3$ and from 80% to 20% of $TiO_2$, particularly 60% of $Al_2O_3$ and 40% of $TiO_2$.

The metal, which is one of the two constituents of the laser-light absorber, may be any metal having a good heat conductivity. Copper or aluminum is most advantageously used as the metal. The metal is usually in the form of a sheet or plate, since the laser-light absorber receives the laser beam on a flat receptor surface thereof. The metal may have a convex or concave surface. Metal sheets may be assembled to define a water-cooling chamber in order to enchance property (5).

The thickness of flame-sprayed metal oxide film is appropriately determined depending on the laser energy to be applied on the absorber, but is usually from 10 to 100 $\mu$m. If the flame-sprayed metal oxide film is thinner than 10 $\mu$m, the metal, i.e., the backing of the laser-light absorber, tends to be damaged by the laser. If the flame-sprayed metal oxide film is thicker than 100 $\mu$m, the film tends to embrittle and lessen in durability. The flame-sprayed metal oxide film should be as thin as possible in light of its cooling characteristic.

The thickness of metal, which is usually in the form of a sheet or plate, is not particularly restricted from the viewpoints of properties (1) to (5).

The laser-light absorber according to the present invention can be used as described with reference to FIGS. 1 to 5. In addition, the laser-light absorber according to the present invention can be used a nonreflective terminal can also be used, in a large-sized working machine, and a shield against leakage laser light reflected from a workpiece. As a specific example of an apparatus in which the laser-light absorber according to the present invention is used, a tester for measuring laser power is described.

Figure 4:
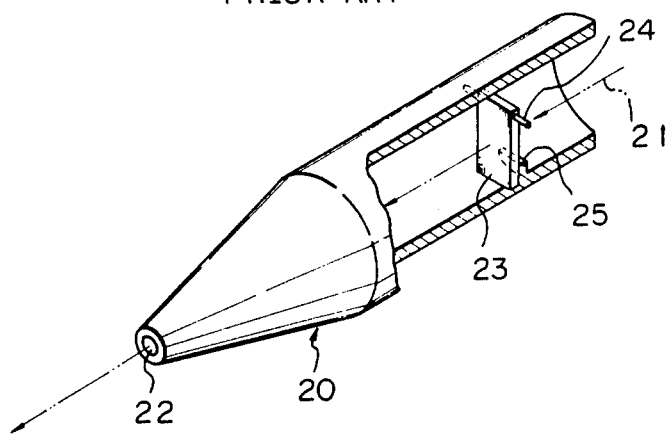
Figure 5:
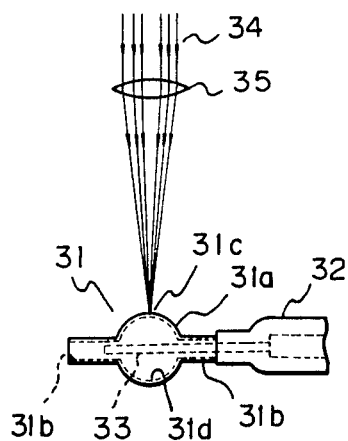
Figure 6:
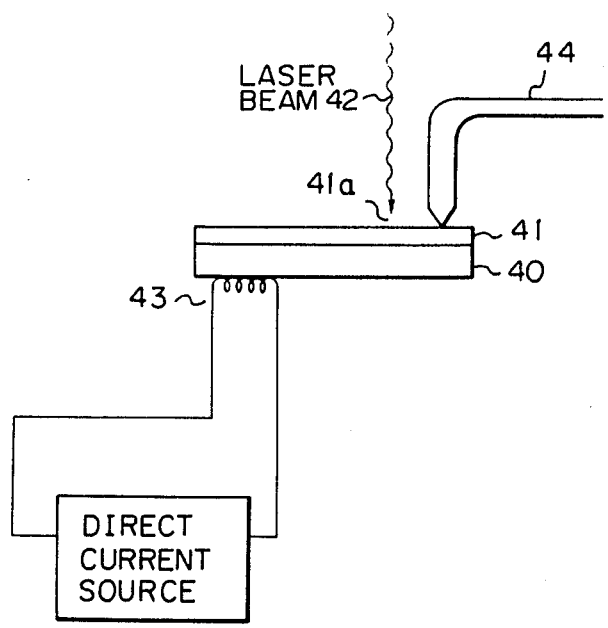
FIG. 6 shows a laser-power tester utilizing an embodiment of a laser-light absorber of this invention

In FIG. 6, the back plate 40 made of metal is covered by the flame-sprayed metal oxide film 41. A laser beam 42 impinges upon a portion 41a of the flame-sprayed oxide film 41. A heater 43 heats the flame-sprayed metal oxide film and back plate to a predetermined reference temperature. A thermocouple 44 is connected to the flame-sprayed metal oxide film to measure the temperature increase due to the beam impinging and the energy absorption. In the tester described above, a low heat capacity of the portion 41a is required for accurate measurement of the laser power. This can be attained by appropriately determining the thickness of the flamesprayed metal oxide film 41 as described above and using copper or aluminum for the back plate 40.

As understood from the above descriptions, the present invention is also related to a method for absorbing laser light, including the steps of: preparing a laser-light absorber including a metal body and flame-sprayed film essentially consisting of metal oxide and applied on the metal body; orienting the flamesprayed film toward a source of the laser light; exposing the flame-sprayed film to irradiation of a beam of the laser light; and absorbing the beam of the laser light by an exposed portion of the flame-sprayed film in an amount of at least approximately 90% and approximately 97.5% at the highest in terms of inverse reflectivity.

The method for flame spraying is now described. The flame spraying is described, for example, in "Science and Technology of Surface Coating", A NATO Advanced Study Institute, Academic Press, London and New York, 1974, pp. 262 to 269. This text is referred herein to illustrate a known flame-spraying method used in the method for forming the flame-sprayed coating according to the present invention. It is preferred that the size of metal oxide powder be small, since the smaller the size, the better the property (5). The size of the oxide powder is preferably from 5 to 44 $\mu$m.

The present invention is further explained by way of an example.

EXAMPLE

Aluminum sheet and copper sheets 40 mm in length, 50 mm in width, and 4 mm in thickness were prepared. The surfaces of the sheets were roughened by sand blasting with an alumina abrasive.

The powders shown in Table 1 were prepared and were flame-sprayed on the sheets under the following conditions.

Size of Powder (Flame Spray Material): 10 to 40 μm
Feeding Rate of Powder: 50 g/min
Feeding Rate of Argon Gas: 35 l/min
Plasma Voltage: 30 V The reflectivity of the so-formed ceramic film was measured as follows.

A high-power calorimetric meter using a copper disc having a chromium-plating film, was used as a reference reflection sheet. The reference reflection sheet was placed at an end of an infrared integrating sphere and was subjected to irradiation of a $CO_2$ laser beam having a wavelength of 10.6 μm so as to measure the reference reflectivity of the chromium-plated copper disc. One of the composite bodies was then irradiated with a $CO_2$ laser beam having a wavelength of 10.6 μm.

The above-described procedure was repeated for each composite body.

The composite bodies were further subjected to irradiation of a $CO_2$ laser beam of 400 W emission power, 15 mm beam diameter, and 226 W/mm$^2$ power density over 2 min so as to determine the discoloration of the ceramic film. For comparison purposes, discoloration of a copper disc having a chromium plating was tested.

TABLE 1

| Sample Nos. | Metal sheet | Kind and composition of powder (%) | Film thickness (μm) | Reflectivity (%) | Color after irradiation |
|---|---|---|---|---|---|
| Invention | | | | | |
| 1 | Al | 600#$Al_2O_3$ (99.6) | 60 | 11.8 | Slight discoloration |
| 2 | Al | 1000#$Al_2O_3$ (99.6) | 50 | 12.3 | Slight discoloration |
| 3 | Cu | $Al_2O_3$(60)—$TiO_2$ (40) | 30 | 3.8 | No change |
| 4 | Cu | $Al_2O_3$(40)—$TiO_2$ (60) | 50 | 3.0 | Slight discoloration |
| 5 | Cu | $Al_2O_3$(20)—$TiO_2$ (80) | 50 | 2.8 | Slight discoloration |
| 6 | Cu | $TiO_2$ (100) | 40 | 2.6 | No change |
| Comparative | | | | | |
| 7 | Cu | Cr plating | 5 | 12 | Generation of cracks |

Note:
"#" indicates grain size stipulated in JIS R 6001

The reflectivity of the chromium-plate copper disc was 12%. The reflectivity of the composite bodies was lower than that of the chromium-plated copper disc except for Sample No. 2. The reflectivity of Sample No. 2 was approximately the same as that of the chromium-plated copper disc (Sample No. 7). It appears that due to the small particle size (#1000) of $Al_2O_3$, the reflectivity of Sample No. 3 was as high as that of Sample No. 7. As is apparent from Table 1, the absorbing characteristics of the ceramic film is superior to or comparable to that of the chromium-plated copper.

The color change of Sample No. 7 was not accurately determined since cracks were formed. This indicated a considerably lower heat resistance of the metallic absorber than that of the ceramic films (Sample Nos. 1 to 6).

We claim:

1. A laser-light absorber comprising a metal body and a flame-sprayed film essentially consisting of a ceramic metal oxide applied on said metal body, whereby laser-light is absorbed by said absorber to an extent of at least about 90%.

2. A laser-light absorber according to claim 1, wherein said flame-sprayed film is from 10 to 100 μm in thickness.

3. A laser-light absorber according to claim 1, wherein said flame-sprayed film consists of at least one ceramic metal oxide selected from the group consisting of $Al_2O_3$, $TiO_2$, $ZrO_2$ MgO, and $Cr_2O_3$.

4. A laser-light absorber according to claim 3, wherein said flame-sprayed film consists of $Al_2O_3$ and $TiO_2$.

5. A laser-light absorber according to claim 4, wherein said flame-sprayed film consists of from 20% to 80% of $Al_2O_3$ and from 80% to 20% of $TiO_2$.

6. A laser-light absorber according to claim 1, 3, 4, or 5, wherein said metal body consists of one member selected from copper and aluminum.

7. A method for absorbing laser light, comprising the steps of:
preparing a laser-light absorber comprising a metal body and a flame-sprayed film essentially consisting of ceramic metal oxide and applied on said metal body;
orienting said flame-sprayed film toward a source of laser light;
exposing said flame-sprayed film to irradiation of a beam of the laser light; and
absorbing said beam of the laser light by an exposed portion of said flame-sprayed film in an amount of at least approximately 90% to approximately 97.5% at the highest in terms of inverse reflectivity.

8. A method according to claim 7, wherein said flame-sprayed film consists of at least one ceramic metal oxide selected from the group consisting of $Al_2O_3$, $TiO_2$, $ZrO_2$, MgO, and $Cr_2O_3$.

9. A method according to claim 7, wherein said flame-sprayed film is from 10 to 100 μm in thickness.

10. A method according to claim 8, wherein said flame-sprayed film consists of $Al_2O_3$ and $TiO_2$.

11. A method according to claim 10, wherein said flame-sprayed film consists of from 20% to 80% of $Al_2O_3$ and from 80% to 20% of $TiO_2$.

12. A method according to claim 7, 8, 10, or 11, wherein said metal body consists of one member selected from copper and aluminum.

* * * * *